UNITED STATES PATENT OFFICE.

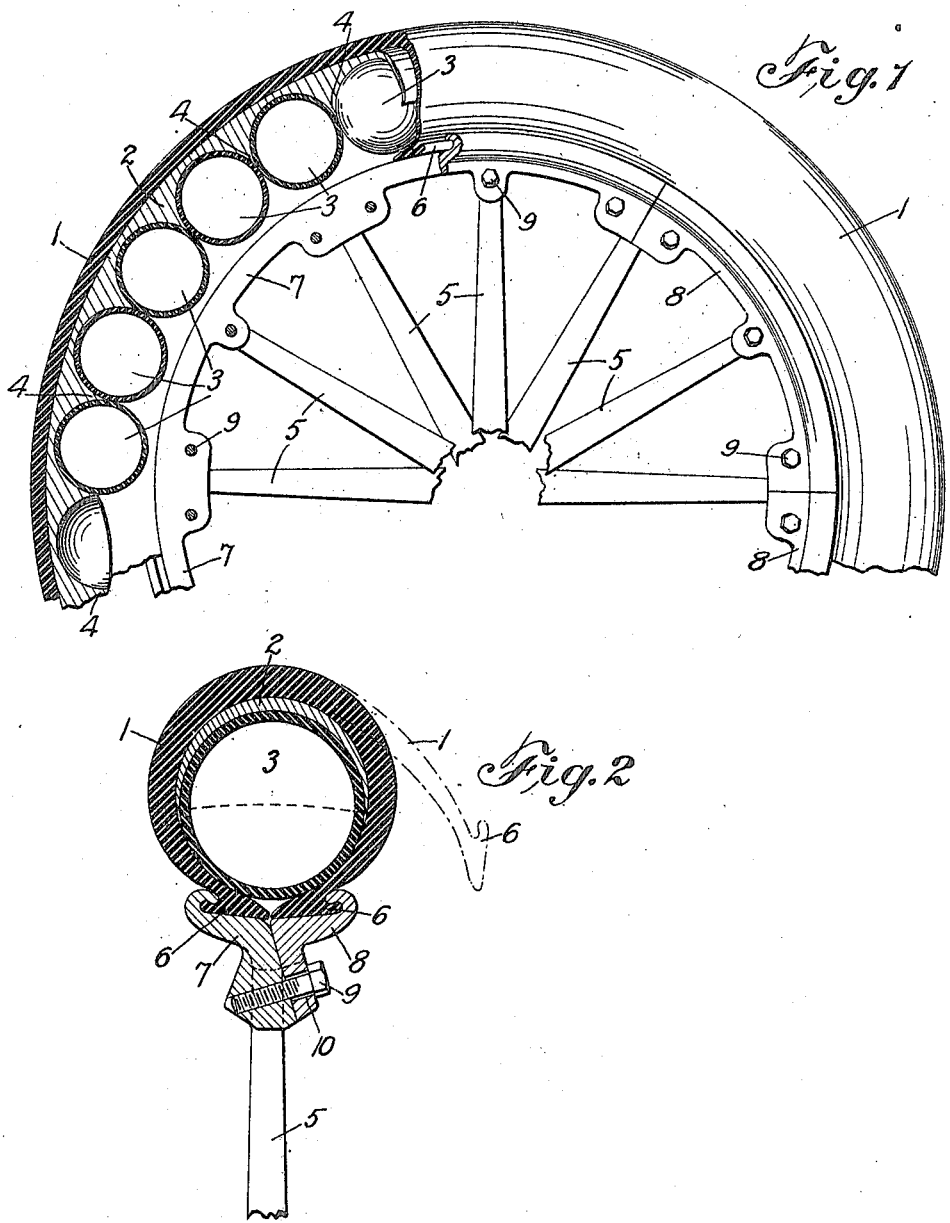

ALBERT MALSIN, OF NEW YORK, N. Y.

PNEUMATIC TIRE.

1,187,637. Specification of Letters Patent. Patented June 20, 1916.

Application filed November 26, 1912. Serial No. 733,624.

*To all whom it may concern:*

Be it known that I, ALBERT MALSIN, a citizen of the United States, residing at New York city, in the county of New York and State of New York, have invented certain new and useful Improvements in Pneumatic Tires, of which the following is a specification, reference being had therein to the accompanying drawing.

My present invention is concerned with a pneumatic tire for vehicles of various kinds.

The object is to enable a tire to be provided which will sustain one or more punctures without serious injury, and thus preserve its integrity and efficiency until a repair can be made.

The invention consists essentially in the use of a series of inflated balls of spherical or similar form, arranged within the shoe of the tire; and also the invention may be said to comprise numerous changes and modifications in the construction, arrangement and combination of parts, substantially as will be hereinafter described and claimed.

In the accompanying drawing illustrating my invention: Figure 1 is a partial side elevation in partial section of the wheel equipped with my improved pneumatic tire. Fig. 2 is a cross section of the same.

Similar characters of reference denote similar parts in the different views.

1 designates the outer, hollow, circular shoe having the flanges 6, 6 designed to meet in close contact within the rim, as indicated in the cross sectional view in Fig. 2. I lay no special claim to any feature of novelty in the outer shoe 1, as it may be of any common and well-known construction. The flanges 6 of the shoe are received in curved parts 7 and 8 of the rim. The part 7 is a circular part to which the spokes 5 are secured, and said part is grooved so as to properly take into it the flange 6 and securely hold it. The part 8 is made in sections which are each in the form of the arc of a circle, and they are secured to the other part 7 of the rim by means of suitable bolts, screws or other fastening devices 9, which pass through holes 10 in the parts 8 and engage the rim 7. The holes 10 are somewhat larger than the bolts 9 so as to allow of a little play in the making of the adjustment. The parts 8 fit snugly against the part 7 and hold the other flange 6 of the shoe 1 close against the flange 6, which is supported in the rim part 7, all as clearly indicated in Fig. 2. The object of having the sections 8 is to enable them to be individually removed from the part 7 so as to permit the flange 6 on one side of the shoe 1 to be pulled out as indicated in the dotted lines in Fig. 2 in order to allow the introduction of the spherical balls 3 into the interior of the shoe.

Inside of the shoe 1 is a circular ring 2 of rubber fabric, or any other suitable material, which fits neatly around inside of the shoe and is formed with a series of concave recesses between which are the projections 4. These recesses are hemispherical in form. The projections 4, therefore, reach to the center line of the hemispheres.

Inside of the shoe, and fitting neatly within the concave recesses in the inner rim 2 is a series of inflated balls of a spherical or similar form, which fit neatly and tightly within these recesses and are in contact with each other at points adjacent to the ends of the intermediate projections 4. The row of inflated balls is indicated in Fig. 1. They are manufactured apart from the tire and are inflated in any suitable way and introduced after inflation into the tire by being placed within the shoe 1 and in the recesses in the inner rim 2. The balls are somewhat larger than the inner circumference of the tire, so as to enable them to be placed inside under pressure. It should be noted, moreover, that the rim 2 having the recesses or compartments therein may be made as a separate strip as I have shown it, or it may be made integral with the shoe 1. Said compartments and the projections 4 between them are quite essential to the successful construction and operation of the device, because without them should one of the balls burst the others would become loose, thereby causing friction and making the other balls burst. With this compartment arrangement, however, when a ball bursts the others remain firmly in position. By using a series of balls it is possible to distribute the pressure throughout the entire tire.

The sectional rim is an important feature because it enables the balls to be inserted in the shoe. The screws 9 are preferably inserted on an angle so as to draw the sections 8 more tightly against the sections 7 and thus bring the flanged edges 6 of the shoe tightly against each other so as to enable the balls 3 to be pressed down firmly into their proper places.

It will be obvious that when a puncture occurs which deflates one of the balls 3 the others will not be affected, and the integrity of the tire will not be injured. Several balls in different parts of the circumference might be punctured without causing the tire to become flat. The user, by having a supply of balls, can, when a convenient opportunity offers, remove the rim pieces and insert new balls in place of the broken ones. This can be done very easily and effectively, and hence my tire offers a device in which the possibility of destruction of the tire is reduced to the minimum and repairs are made easy. Obviously, the balls 3 need not be precisely spherical, but may have any other convenient, but generally spherical, form. Further, it will be observed that many changes in the precise construction, arrangement and combination of parts may be made without exceeding the scope of my invention.

Having thus described my invention, what I claim as new and desire to secure by Letters Patent, is:—

1. In a wheel, the combination of a rim consisting of a circular part having a beveled edge, to which part the spokes are secured, said part being grooved so as to properly receive one of the flanges of the shoe, and comprising also another part made in sections, each in the form of the arc of a circle and having beveled edges adapted to rest on the beveled edge of the circular part, together with bolts passing through holes in the said sections and entering the circular part for the purpose of securing the sections to the circular part the holes in the sections being larger than the bolts so as to give a certain amount of play, all arranged so that the sections may be individually removed from the circular part so as to permit the part at one side of the shoe to be removed to allow the introduction of the shoe and other parts.

2. In a wheel, the combination of a rim comprising a circular bevel-sided part to which the spokes are secured, such part being grooved to receive one of the flanges of the shoe, and comprising another part made with grooved sections which are also bevel-sided each in the form of the arc of a circle and secured to the circular part by bolts passing through openings in the sectional parts and engaging the circular part, the holes in the sections being of such size as to allow the bolts to have a certain amount of play in making the attachment, all arranged so that the sections may be individually removed from the circular part to permit the introduction of parts into the interior of the shoe.

In testimony whereof I affix my signature in the presence of two witnesses.

ALBERT MALSIN.

Witnesses:
 JEANETTE STORK,
 L. S. PERRINE.